United States Patent

[11] 3,560,741

| | | |
|---|---|---|
| [72] | Inventor | Ove Magnus Strindehag<br>Nykoping, Sweden |
| [21] | Appl. No. | 774,544 |
| [22] | Filed | Nov. 8, 1968 |
| [45] | Patented | Feb. 2, 1971 |
| [73] | Assignee | Aktiebolaget Atomenergi<br>Stockholm, Sweden<br>a company of Sweden |
| [32] | Priority | June 16, 1966 |
| [33] | | Sweden |
| [31] | | 8257/66 |
| | | Continuation of application Ser. No.<br>641,884, May 29, 1967. |

[54] DEVICE FOR DETECTING PRESENCE OF FISSION PRODUCTS IN THE COOLANT LIQUID OF A NUCLEAR REACTOR
2 Claims, 1 Drawing Fig.

[52] U.S. Cl............................................ 250/71.5,
250/43.5

[51] Int. Cl............................................ G01t 1/22
[50] Field of Search.................................. 250/71.5

[56] References Cited
UNITED STATES PATENTS

| 3,049,619 | 8/1962 | Genovese............... | 250/71.5 |
| 3,202,819 | 8/1965 | Christianson............ | 250/71.5 |

*Primary Examiner*—Ralph G. Nilson
*Assistant Examiner*—Morton J. Frome
*Attorney*—Pierce, Scheffler & Parker

ABSTRACT: A device for measuring radioactive radiation in a liquid, comprising a measuring chamber with inlet and outlet for the liquid, and a photomultiplicator connected to the measuring chamber for the purpose of measuring the Cerenkov radiation generated in the liquid in which the walls of the measuring chamber are provided with a relatively thick layer of an optically transparent material, resulting in the energy resolution of the device being increased.

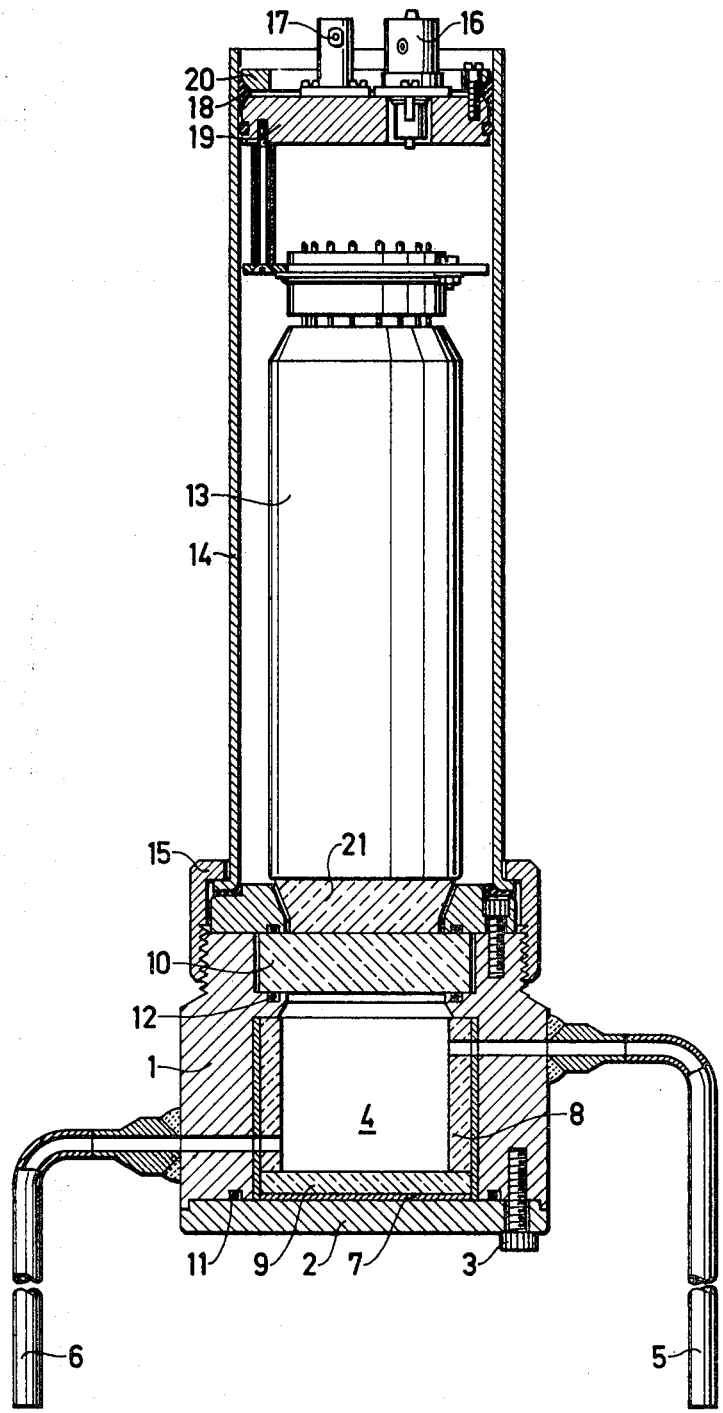
INVENTOR
Ove Magnus Strindehag
BY Pierce, Scheffler & Parker
ATTORNEYS

DEVICE FOR DETECTING PRESENCE OF FISSION PRODUCTS IN THE COOLANT LIQUID OF A NUCLEAR REACTOR

This application is a continuation of application Ser. No. 641,884, filed May 29, 1967.

The present invention relates to a device for measuring radioactive radiation in a liquid. The invention is especially concerned with a device for detecting fission products in the coolant liquid of a nuclear reactor, especially such fission products which have leaked out from a damaged fuel element in a water-cooled nuclear reactor.

The device according to the invention comprises a detector of the type known as a Cerenkov detector i.e. the detector embodies a measurement chamber having an inlet and an outlet for the liquid and photomultiplicator associated with the measuring chamber for measuring the Cerenkov radiation generated in the liquid. A Cerenkov detector is especially suitable for the object according to the invention because it can operate at high pressure. However, known Cerenkov detectors have an unsatisfactory resolution of energy which becomes evident for example when it is necessary to differentiate the beta radiation, generated by leakage of fission products, from the beta radiation that is generated by products of corrosion and unstable isotopes that have been formed on the irradiation of the water in the reactor. These unstable isotopes are of short duration, and it is therefore possible to reduce or eliminate their effect by selecting a time of 3—5 minutes for the transfer of the water from the reactor to the measuring chamber. The background radiation that is generated by the corrosion products has a fairly low energy, usually less than 2.8 Mev., and can in general be differentiated from the radiation of higher energy, usually 4—8 Mev., generated by the fission products. However, for this differentiation it is necessary for the detector to have a fairly good energy resolution, and this invention is first and foremost concerned with improving the said energy resolution.

The device according to the invention is characterized by the walls of the measuring chamber being provided with a relatively thick layer of an optically transparent material. Such beta rays which would otherwise have come into contact with the wall of the measuring chamber without having generated any Cerenkov radiation will now generate such a radiation on passing through the optically transparent material, whereby the efficiency of the detector is increased. This increase of efficiency is especially noticeable with beta radiation of high energy and long range, and thereby the ability of the detector to differentiate between radiation of high and low energy is also increased. The increased efficiency also makes it possible to decrease the volume of the measuring chamber. A conventional measuring chamber having a volume of e.g. 50 cm.$^3$ can be decreased to 10 cm.$^3$ by utilizing the invention.

The majority of solid transparent materials have shown themselves suitable for application as the transparent layer according to the invention. It is preferable, however, to utilize glass, quartz or plastic preferably of the Plexiglass type, the thickness of the transparent layer should lie at 10—15 mm.

The invention will now be more closely described with reference to the appended drawing which illustrates a device for detection of beta radiation in the coolant water of a nuclear reactor.

The device comprises a measuring chamber 4 embodied in a cylindrical pressure vessel 1 having an end wall 2 secured to the cylindrical part by means of screws 3. Water is supplied to the measuring chamber through a conduit 5 and discharged through a conduit 6. The cylindrical wall and said glass end wall are coated with a white layer 7 that serves as an optical reflector. Inside the optical reflector is arranged a thick transparent layer comprising a cylindrical part 8 and a flat circular part 9.

The other end wall of the measuring chamber 4 is formed by a thick window 10 of e.g. quartz glass. Between each of the end walls 2, 10 and the cylindrical pressure vessel, seals in the form of O-rings 11 and 12 are provided.

A photomultiplicator 13 is connected to the window 10, the photomultiplicator being disposed in a casing 14 which is secured to the pressure vessel 1 by means of a nut 15. The casing 14 is provided with a connection 16 for a high voltage supply to the photomultiplicator, and further with a connection 17 to enable the photomultiplicator to be coupled to an amplifier. The foremost part of the photomultiplicator is provided a glass disc 21 that is pressed against the window 10 by a resilient ring 18 which acts between a disc 19 that is movable in the sleeve 14 and a ring 20 which is secured inside the sleeve 14.

If so desired a transparent material corresponding to the wall 9 can be inserted in front of the window 10, but in general this can be considered unnecessary, because the beta radiation which contacts the window produces a Cerenkov radiation therein.

In a detector of the type illustrated, which had a measuring chamber volume of 50 cm.$^3$, the transparent material consisted of 6 mm. thick wall of the plastic having the trademark Lucite. The optical reflector consisted of a white paint of the epoxy type. In the detector the radiation was measured from $Rb^{88}$, which has a maximum beta energy of 5.3 Mev., and $Y^{90}$ which has a maximum beta energy of 2.2 Mev. The result of the measurement showed that the efficiency for $Rb^{88}$ increased through the introduction of the transparent material. Simultaneously it was found that the efficiency for the radiation with the lesser energy content from $Y^{90}$ was unchanged or even decreased somewhat. The result was that the ratio between the efficiencies was improved by 60 percent which signifies a considerable improvement in the energy resolution of the detector.

An increase of the transparent wall thickness from 6 to 15 mm. resulted in a still higher increase of the energy resolution.

The illustrated detector is designed to operate at a high pressure, and therefore the measuring chamber is situated in a strong metallic housing. In a low pressure detector the walls of the measuring chamber may consist entirely of a transparent material such as Plexiglass. The outer surface of said transparent measuring chamber should preferably be coated with a light reflecting paint, and the measuring chamber should be situated in a dark housing.

I claim:

1. In a Cerenkov detector for detecting the presence of fission products in the coolant liquid of a nuclear reactor having a measuring chamber with an inlet and an outlet for the coolant liquid and a photomultiplier connected to the measuring chamber for the purpose of measuring the Cerenkov radiation generated by the fission products in such coolant liquid as emit beta-radiation of an energy of more than 4 Mev., the improvement comprising a layer of 6—15 mm. of an optically transparent material lining the interior of the measuring chamber.

2. A Cerenkov detector for detecting the presence of radiations of fission products in the coolant liquid of a nuclear reactor, comprising a pressure chamber, means for supplying and withdrawing coolant liquid to the pressure chamber, a layer of an optically transparent solid material having a thickness of 6-—15 mm. and lining the pressure chamber, a white reflector layer between the optically transparent solid material and the wall of the pressure chamber, a window in the pressure chamber, and a photomultiplier connected to said window for measuring the Cerenkov radiation generated by such fission products in the coolant liquid as emit beta radiation of an energy of more than 4 Mev.